(12) United States Patent
Oerlemans et al.

(10) Patent No.: US 6,941,404 B2
(45) Date of Patent: Sep. 6, 2005

(54) DATA TRANSFER DEVICE, TRANSACTION SYSTEM AND METHOD FOR EXCHANGING CONTROL AND I/O DATA WITH A DATA PROCESSING SYSTEM

(75) Inventors: Robert V. M. Oerlemans, Eindhoven (NL); Harm Braams, Nieuwgein (NL)

(73) Assignee: Safenet B.V., Boxtelseweg (NL)

( * ) Notice: Subject to any disclaimer, the term of this patent is extended or adjusted under 35 U.S.C. 154(b) by 350 days.

(21) Appl. No.: 10/025,375

(22) Filed: Dec. 18, 2001

(65) Prior Publication Data

US 2002/0091889 A1 Jul. 11, 2002

(30) Foreign Application Priority Data

Dec. 19, 2000 (EP) ............................................. 00204597
Jul. 4, 2001 (EP) ............................................. 01202571

(51) Int. Cl.[7] ............................................. G06F 13/14
(52) U.S. Cl. ..................... 710/305; 235/382; 235/382.5; 713/200
(58) Field of Search ............................... 235/375, 379, 235/380, 382, 382.5; 713/150–202; 710/100, 305, 306

(56) References Cited

U.S. PATENT DOCUMENTS

| | | | |
|---|---|---|---|
| 5,517,569 A | 5/1996 | Clark | 380/52 |
| 5,815,577 A | 9/1998 | Clark | 380/52 |
| 6,029,147 A | 2/2000 | Horadan et al. | 705/35 |
| 6,138,239 A * | 10/2000 | Veil | 713/200 |
| 6,557,104 B2 * | 4/2003 | Vu et al. | 713/189 |
| 6,598,032 B1 * | 7/2003 | Challener et al. | 705/72 |
| 6,643,783 B2 * | 11/2003 | Flyntz | 713/201 |
| 2002/0095601 A1 * | 7/2002 | Hind et al. | 713/201 |

FOREIGN PATENT DOCUMENTS

| | | |
|---|---|---|
| EP | 0 924 667 A2 | 6/1999 |
| WO | WO 98/05009 | 2/1998 |
| WO | WO 99/06970 | 2/1999 |

OTHER PUBLICATIONS

Pijenburg, "Secured Smart Card Read Chip, PCC807," *DATASHEET*, vol. 1.2, pp. 1–2, Sep. 2000.

FinSmart Security, "Enabling E–Commerce with the FinSmart Smart Card Security Solution", *WHITEPAPER*, pp. 1–15, Oct. 2000.

* cited by examiner

*Primary Examiner*—Glenn A. Auve
(74) *Attorney, Agent, or Firm*—Seed IP Law Group PLLC

(57) ABSTRACT

A data transfer device, having first data interface means for exchanging data with a data processing system, second data interface means for exchanging data with a user of the data transfer device, and control means for controlling data transfer between the first and second data interface means. The control means are configured for receiving control data from the first data interface means for selectively enabling data exchange between the first and second data interface means. The control means can be configured for enabling part of the first and second data interface means for operation in a first or open mode, and for enabling the second data interface means for operation in a second or secure mode of operation. The second data interface means may comprise Input/Output means for secure data exchange with the first data interface means under the control of program execution data operative in the data transfer device and comprised by the control data.

36 Claims, 5 Drawing Sheets

DATA TRANSFER DEVICE, TRANSACTION SYSTEM AND METHOD FOR EXCHANGING CONTROL AND I/O DATA WITH A DATA PROCESSING SYSTEM

BACKGROUND OF THE INVENTION

1. Field of the Invention

The present invention relates, generally, to data communication and, more specifically, to a data transfer device, a transaction system, a method and an Application Specific Integrated Circuit (ASIC) device for exchanging data between remote processing devices.

2. Description of the Related Art

Data storage means, such as chip cards and other electronic data carriers have become increasingly popular for performing financial transactions, for purchasing merchandise, for banking, and other type of data transactions such as for identification and verification purposes.

With the present possibilities for purchasing merchandising, paying bills and the like via the Internet, there is a growing need for completing such transactions using chip cards, credit cards, and the like. However, for this type of "virtual" shopping and banking, security of the transactions is a major problem. This, because a transaction via the Internet involves transmission of data via public, unsecured networks.

U.S. Pat. No. 5,815,577 discloses an encryption module comprising pre-programmed software resident within the module and configured to identify and accommodate a plurality of data input devices, such as scanners, magnetic strip readers, smart card readers, and the like. This module, due to its pre-programmed resident software, fulfills the function of trusted device, such that transactions which are performed through this module can be trusted as to their authenticity. However, this known module has some inherent disadvantages.

Due to the need for pre-programmed software, the module is restricted to operate with data from a known type of chip card of a known transaction entity, such as a bank, for example. Those skilled in the art will appreciate that this concept is not suitable for the handling of chip cards of transaction entities for which suitable processing software has not been previously incorporated in the module. For adding such software later on, one has to understood that hundreds or even thousands of such modules have to be updated manually in such a case.

This is also true in the case of a change in the processing functions of known chip cards which are supported by the module and for which the already available software in the module has to be updated or even completely revised.

Although it is theoretically feasible to configure the known module for the processing of different chip cards of different transaction entities among others, due to lack of co-operation and standardization between such transaction entities, in practice, each module operates with a single chip card or other data storage device of a single transaction entity. Accordingly, for each chip card or data storage device a different trusted device has to be installed and used, which leads to an uncomprehensive, impractical and not to manage transaction system.

Although it is feasible to provide the trusted devices with a data receive or download facility, for example, for receiving or downloading suitable software for processing new chip cards, a problem arises in the case of transferring this software via common or public data networks, such as the Internet. This, because hackers and others may copy and change the software, such that the security of the trusted device and its proper operation in reading and/or writing data of a data storage device, such as a chip card, can no longer be guaranteed.

SUMMARY OF THE INVENTION

It is an object of the present invention to overcome the shortcomings of the prior art.

In accordance with a first aspect of the present invention, a data transfer device is provided, having first data interface means for exchanging data with a data processing system, second data interface means for exchanging data with a user of the data transfer device, and control means for controlling data transfer between the first and second data interface means, wherein the control means are configured for receiving control data from the first data interface means for selectively enabling data exchange between the first and second data interface means.

Data exchange between the first and second data interface means can be provided, in a further embodiment of the data transfer device according to the invention, such that the control means are configured for enabling part of the second data interface means for operation in a first or open mode.

In a yet further embodiment of the data transfer deceive according to the invention, the control means are configured for enabling the second data interface means for operation in a second or secure mode.

In a preferred embodiment of the data transfer device according to the invention, signaling means are provided for signaling the mode of operation of the data transfer device, that is the open or secure mode. Suitable signaling means comprise a Light Emitting Diode (LED) configured such that the LED is illuminated if the data transfer device is in its secure mode of operation.

By selectively enabling data exchange between the first and second data interface means of the data transfer device in accordance with the present invention, data can be exchanged in an open mode or a secure mode of operation of the data transfer device. In the open mode, the data transfer device is operative for exchanging data with a data processing system not requiring a particular type of security. However, in the secure mode of operation, the data transfer device enables data exchange with a data processing system requiring a degree of security. Accordingly, with the data transfer device according to the invention, both secure and non-secure data exchange can be supported, providing already greatly enhanced data processing capabilities compared to the prior art devices as discussed above.

The control means are configured, in a yet further embodiment of the invention, for processing data provided by the first and second data interface means in accordance with the control data. That is, in this embodiment of the invention, the control means comprise data processing capabilities.

In a preferred embodiment of the data transfer device according to the invention, the control means are configured for processing data provided by the first and second data interface in accordance with program execution data to be executed by the data processing system, wherein the program execution data are comprised by the control data. That is, part of a program to be executed by the processing system is transferred to and performed by the data transfer device. By providing that the program execution data transferred to and running on the data transfer device are genuine or trusted data, data exchange between the first and second data interface means of the data transfer device can be likewise performed in a safe and trusted or secure manner.

In accordance with an embodiment of the invention, the program execution data are only executed by the data transfer device if same is set into its secure mode of operation. With this option, according the present invention, a variety of data provided at the second or user data interface means of the data transfer device can be handled safely and in guaranteed manner by transferring the proper and secure control data to the control means of the data transfer device.

In order to set the device safely and guaranteed in either the secure mode or the open mode, in accordance with a yet further embodiment of the invention, the data transfer device comprises data storage means for storing authentication data, and wherein the control means are configured for providing an authentication check on the received control data for setting the data transfer device in either one of the open and secure mode of operation.

Using control data comprising certificate data, and control data means configured for checking the certificate data of the control data with respect to certificate data stored in the data storage means, the data transfer device is set in its secure mode of operation if the certificate data of the control data are approved and the data transfer device is set in its open mode of operation for either one of disapproval of the certificate data and non-availability of certificate data of the control data, and wherein the control data are deleted if the certificate data thereof are false.

In a preferred embodiment of the invention, the second data interface means comprise keypad means, data card reader means and display means, wherein the control means in the open mode are configured for enabling access to the data card reader means, and wherein the control means in the secure mode are configured for enabling access to the keypad means, the data card reader means and the display means.

That is, the keypad means and the display means of the data transfer device are only active in the secure mode. Accordingly, the keypad means and the display means are arranged as "secure" or "trusted" devices, with which data can be exchanged and processed requiring a certain degree of security. In the open mode of operation, the keypad means and the display means are not enabled for data transfer.

In a yet further embodiment of the invention, the second data interface means comprise Input/Output (I/O) means for data exchange with one or a plurality of peripheral device(s), such as, but not limited to, telecommunication devices like a so-called Voice over IP (VoIP) digital telephone device, a video processing device, a monitor, a printer, etc., wherein the I/O means are only enabled in the secure mode of the data transfer device, that is the I/O means are arranged as "secure" or "trusted" via which data can be exchanged and processed requiring a certain degree of security. In the open mode of operation, the I/O means are disabled for data transfer.

The data transfer device, in this embodiment of the invention, provides a type of miniature Trusted Computer Platform (TCP) for performing trusted data exchange, among others providing an effective virus defense, because the data transfer device will only execute program data if the device is set to its secure mode of operation.

With the implementation of an authentication check, the data transfer device according to the invention can be easily arranged for supporting data transfer form a plurality of chip cards or other data storage devices, for example, in both the open or secure mode of operation, thereby providing a flexible device suitable for processing data of a plurality of chip cards and the like.

By configuring the data transfer device, in a still further embodiment of the invention, for processing data provided by the card reader in accordance with the control data received, data exchange in accordance with a plurality of functions supported by a chip card can be provided.

In order to enhance the security of the data transfer between the data transfer device and a data processing system, in a yet further embodiment of the invention, the data transfer device comprises means for supporting encrypted data transfer via the first interface means and the data processing system, thereby making the data exchange unreadable without a proper decryption algorithm and/or password.

A further improvement of the security of the data transfer device is provided in a further embodiment thereof, wherein the control means are configured for erasing the control data after each transaction or after a predetermined time period upon completion of a transaction, for example.

The first data interface means may comprise any standardized computer data interface means, such as USB (Universal Standard Bus) interface means, RS 232 interface means which are known to those skilled in the art, and others.

In accordance with a second aspect of the present invention, a transaction system is provided, comprising a first processing device such as to be operated by an authorization entity, a second processing device such as to be operated by a user, and a data transfer device having first data interface means for exchanging data with a data processing system, second data interface means for exchanging data with a user of the data transfer device, and control means for controlling data transfer between the first and the second data means, wherein the first and second processing devices connect to a data network, the data transfer device with its first interface means connects to the second processing device, and the first and second processing devices being configured for exchanging control data from the first processing device to the data transfer device for selectively enabling the second data interface means of the data transfer device.

In the transaction system according to the invention, transaction data between the first and second processing devices are exchanged through the data transfer device of the present invention, which is either set in its open or its secure mode of operation through suitable control data received by the data transfer device.

In the case of a transaction involving the exchange of secure financial data or other trusted data between the first and second processing devices, such as identity data for retrieving telephone services, video services, or other communication type services, for example, in accordance with a further embodiment of the system following the invention, the first processing means are configured for providing control data for setting the data transfer device in a secure mode and the first and second processing devices and/or the I/O means are configured for enabling a transaction after the control data have been exchanged.

In a yet further embodiment the transaction system comprises a third processing device such as to be operated by a transaction entity, wherein the third processing device connects to the data network, and wherein the first processing device is configured for enabling a transaction between the second and third processing devices dependent on the enabling of the second interface means of the data transfer device.

That is, suppose a user would like to order merchandise from a store, either a real a store or a virtual store, comprising the third processing means. In order that this transaction will be enabled, the merchandise has to be paid, for which financial data have to be exchanged between the user and a financial entity, such as a bank, comprising the first processing means.

Suppose that the user wishes to pay by using a credit account receding at the financial entity, appropriate financial data have to be exchanged between the user and the financial entity. If the user would like to use a credit card or a chip card or the like, the data transfer device has to be set in a secure mode, operative for processing the data of the particular card. The financial entity, from its first processing device, provides suitable control data to the data transfer device via the second processing device to which the data transfer device connects. Once in its secure mode, data between the first and second processing devices can be securely exchanged. After the completion of this exchange, the merchandise selling entity will be informed, such that the transaction between the second and third processing devices can be enabled and completed.

In a further application example, using the I/O means of the data transfer device for retrieving telecommunication services from a telephone operator or an Internet service provider, for example, operating a third processing device, for identifying a user by a chip card or the like, the data transfer device has to be set in its secure mode. Upon request from the user, an authorization host or clearing house, for example, operating first processing means, provides suitable control data to the data transfer device via the second processing device to which the data transfer device connects. Once in its secure mode, data between the first and second processing devices can be securely exchanged. After the completion of this exchange, the telephone operator or Internet service provider will be informed, such that the data transaction between the second and third processing devices and/or between the I/O means and the third processing device can be enabled and completed.

Those skilled in the art will appreciate that the transaction system according to the invention is not limited to the exchange of financial data, communication or other multimedia data, or the purchase of merchandise and telecommunication or Internet services or the like. In fact, the transaction system according to the invention can be used for any type of transaction wherein the data transfer device operates in either one of its open or secure mode.

In a third aspect of the invention, a method for exchanging data with a data processing system is provided using a data transfer device having first data interface means for exchanging data with the data processing system, second data interface means for exchanging data with a user of the data transfer device and control means for controlling data transfer between the first and second data interface means, which method comprises the steps of:

transferring control data from the data processing system to the data transfer device, and selectively enabling exchange of data between the first and second data interface means of the data transfer device dependent on the control data received.

In a yet further embodiment of the method according to the invention an authentication check is performed on the received control data for setting the data transfer device in its open or secure mode of operation.

For this purpose, according to the invention, the control data comprise certificate data, wherein the control data are checked by the control means with respect to the certificate data, and wherein the data transfer device is set in its secure mode of operation if the certificate data of the control data are approved and the data transfer device is set in its open mode of operation for either one of disapproval of the certificate data and non-availability of certificate data of the control data, and wherein the control data are deleted if the certificate data thereof are false.

In the open mode, the data transfer device can be arranged for exchanging data with the user via the second data interface means through a limited number of data input means, such as data card reader means, whereas in the secure mode data exchange with a plurality of data exchange devices connected to the data transfer device is enabled, including keypad means, card reader means, display means, and the I/O means, for example.

In the secure mode, data provided by the first and second data processing means are processed in accordance with program execution data of a program executed by the data processing system, which program execution data being comprised by the control data. In the embodiment of the invention comprising the I/O means, the I/O means are enabled and disabled under control of the program execution data. That is, if the program data relates to a VoIP service, for example, the microphone and loudspeaker means of a VoIP device connected to the I/O means will be switched on and off under control of the VoIP program execution data operative in the data transfer device.

In a yet further embodiment of the invention, the program execution data are operative in the data transfer device while a data card operatively connects to the card reader means. In order to enhance the security during exchange of data between the data processing system and the data transfer device, in a further embodiment of the method according to the invention, the data are transferred in an encrypted form.

Maximum security is obtained by erasing the control data in the data transfer device after the completion of a data exchange.

The invention relates also to an Application Specific Integrated Circuit (ASIC) device comprising data exchange means and control means for selectively enabling data exchange between first and second data interface means based on control data, in accordance with the invention as disclosed above.

In a yet further embodiment of the invention, the ASIC device further comprises at least one of the first and second data interface means, and/or data processing means for processing data provided by the first and second data interface means in accordance with program execution data provided by the control data. The ASIC device further may comprise data storage means, among others for storing the control data, the program execution data and authentication data.

The above-mentioned and other features and advantages of the invention are illustrated in the following description with reference to the enclosed drawings.

BRIEF DESCRIPTION OF THE SEVERAL VIEWS OF THE DRAWING(S)

DETAILED DESCRIPTION OF THE INVENTION

Without the intention of limitation, the invention will now be explained by its application with a data transfer device comprising a limited number of user data input and output means.

Figure 1:
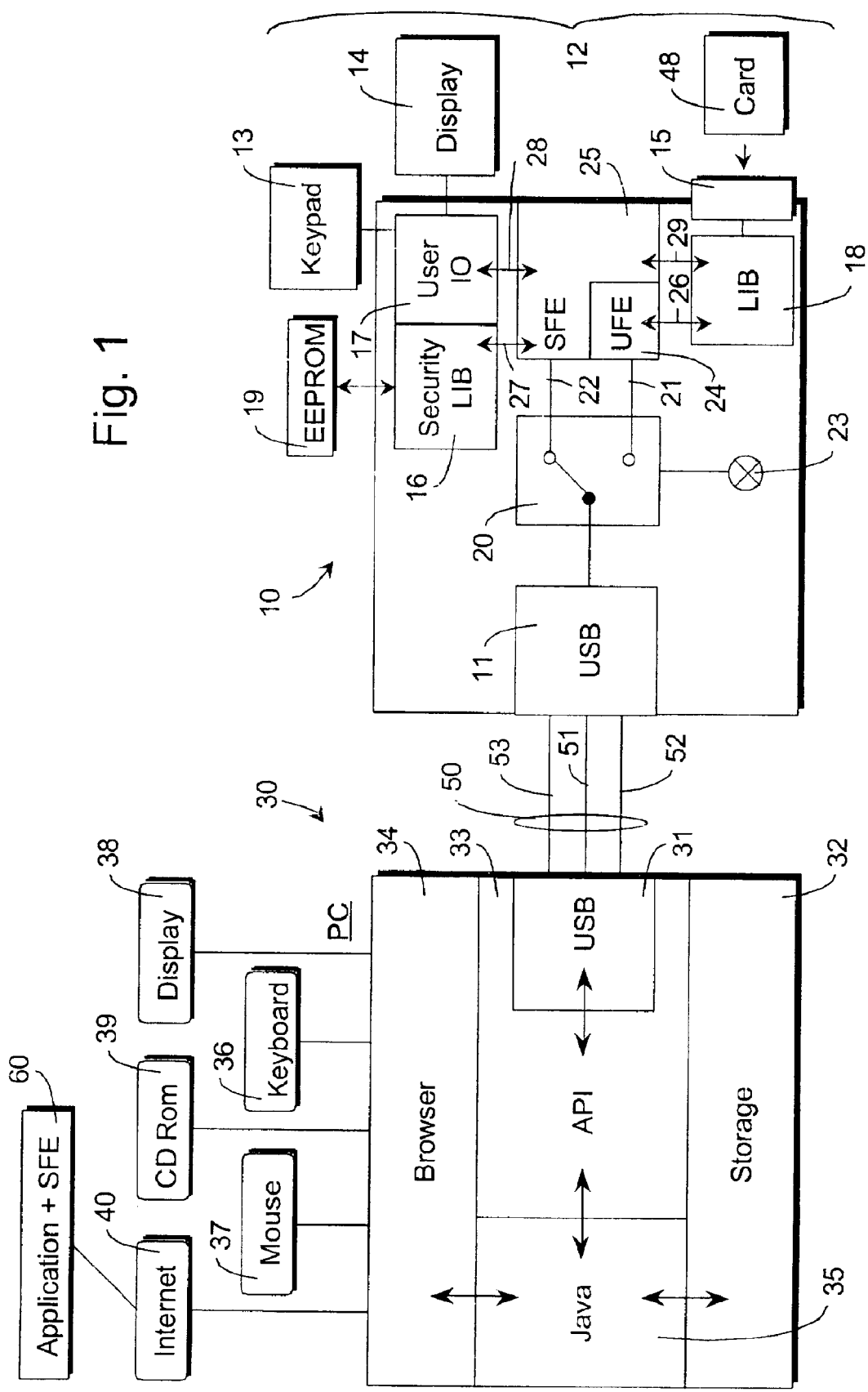
FIG. 1 shows, in a schematic and illustrative manner, a block diagram of a first embodiment of a data transfer device in accordance with the present invention, connected to a processing device, such as a Personal Computer (PC).

In FIG. 1, reference numeral 10 refers to a data transfer device in accordance with the present invention. The data transfer device connects to a Personal Computer (PC) 30 by a standard Universal Serial Bus (USB) or RS 232 data link 50, for example.

The data transfer device 10 comprises first data interface means 11 and second data interface means 12 including keypad means 13, display means 14 and data card reader means 15, such as chip card 48 or magnetic strip card reader means. Those skilled in the art will appreciate that the second data interface means 12 may comprise other well known data input and data output means.

Data transfer between the first and second data interface means 11, 12 is controlled by control means 20 which, for clarity purposes, have been shown in the form of switching means.

In a first or open mode position 21 of the control means 20, data transfer between the first and second data interface means 11, 12 is handled under the control of so-called Unsecured Function Extension (UFE) means 24. In a second or secure mode position 22 data transfer between the first and second data interfaces 11, 12 is controlled by so-called Secure Function Extension (SFE) means 25. The UFE and SFE means 24, 25 are arranged for processing program execution data.

In the open mode, through the UFE means 24, the card reader part 15 of the second data interface means 12 is enabled for the exchange of data with the first data interface means 11. Such as indicated by reference numeral 26.

In the secure mode, the SFE means 25 are configured for enabling data exchange from any of the second data interface means 12, i.e. the keypad means 13, the display means 14 and the card reader means 15. This, as indicated by reference numerals 27, 28 and 29, respectively. Reference numeral 23 denotes a Light Emitting Diode (LED) for indicating the mode of the data transfer device 10. In the preferred embodiment, the LED 23 is illuminated if the device 10 is in its secure mode. Those skilled in the art will appreciate that signaling means other than a LED may be used for this purpose, for example the display means 14.

The data transfer device 10 further comprises data storage means 16, 17 and 18. In use, the storage means 16 comprise so-called security library program data, among others comprising authentication or certification data for use with the SFE means 25. The storage means 17 comprise user I/O library program data, configured for controlling the Input/Output (I/O) with the keypad means 13 and display means 14 of the second data interface means 12. The storage means 18 comprise data configured for controlling the card reader means 15 of the second data interface means 12. Part of the library data may be provided in a non-volatile memory, such as an EEPROM (Electrically Erasable Programmable Read Only Memory) 19. This data may be used for checking public encryption keys on certificate data, for example.

The PC 30 can be a conventional Personal Computer or any other processor controlled device, comprising data interface means 31 for exchanging data with the first data interface means 11 of the data transfer device 10, such as USB or RS 232 data interface means 31. Further, the PC 30 comprises data storage means 32 for storing data, an Application Programming Interface (API) 33 which operates with browser software 34, and application software 35, such as the well-known Java software.

The PC 30 further comprises keyboard means 36, mouse means 37, display or monitor means 38, data input means such as a CDROM interface with the Internet.

The UFE and SFE means 24, 25 are configured for executing program data in conjunction with the application software 35 of the PC 30. That is, the UFE and SFE means functions either as an unsecure extension or a secure extension of the software 35 to be executed in the data transfer device 10.

As schematically indicated, through the data network interface 40 application data are exchanged with an application 60 running on a remote processing device (not shown).

For clarity purposes, the data link 50 comprises a control part 51, a download part 52 and an application part 53.

The control part 51 provides overall control of the data exchange between the data transfer device 10 and the PC 30. The download part 52 is arranged for downloading data into the data transfer device 10 from the PC 30. The application part 53 is operative for controlling the UFE means 24 and the SFE means 25 of the data transfer device 10.

Figure 2:
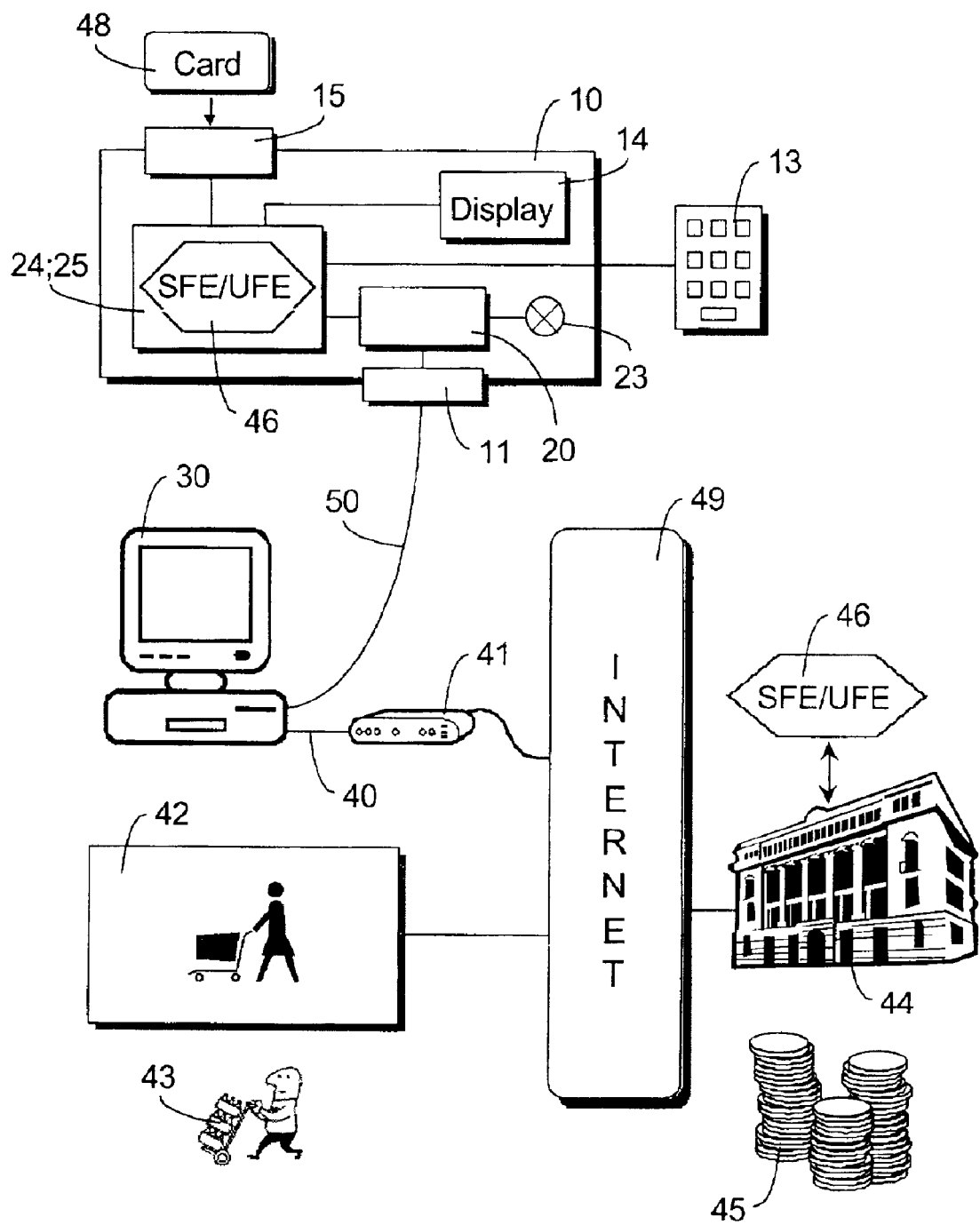
FIG. 2 shows, in a schematic and illustrative manner, a transaction system in accordance with the present invention.

FIG. 2 illustrates, in a schematic manner, a typical transaction system according to the present invention.

The data transfer device 10 with its keypad means 13, display means 14, card reader means 15 and signaling means 23 connects via its first interface means 11 and the data link 50 to a processing device such as PC 30, to be operated by a user of the transaction system. As illustratively indicated, the PC 30 connects via an Interface 40 and a modem or other suitable data link connection device 41 to a data network such as the Internet 49.

Further a, transaction entity having a processing device 42 connects to the Internet 49, for example a grocery shop either a real or a virtual shop, for selling merchandise or goods 43.

An authorization or authentication entity having a processing device 44, such as a bank or clearing house, likewise connects to the Internet 49.

For the sake of clarity, in the following description, it is assumed that data between the processing devices 30, 42 and 44 are exchanged via known and/or standardized communication protocols, which are well known to those skilled in the art, such that no further description thereof has to be provided here.

Figure 3:
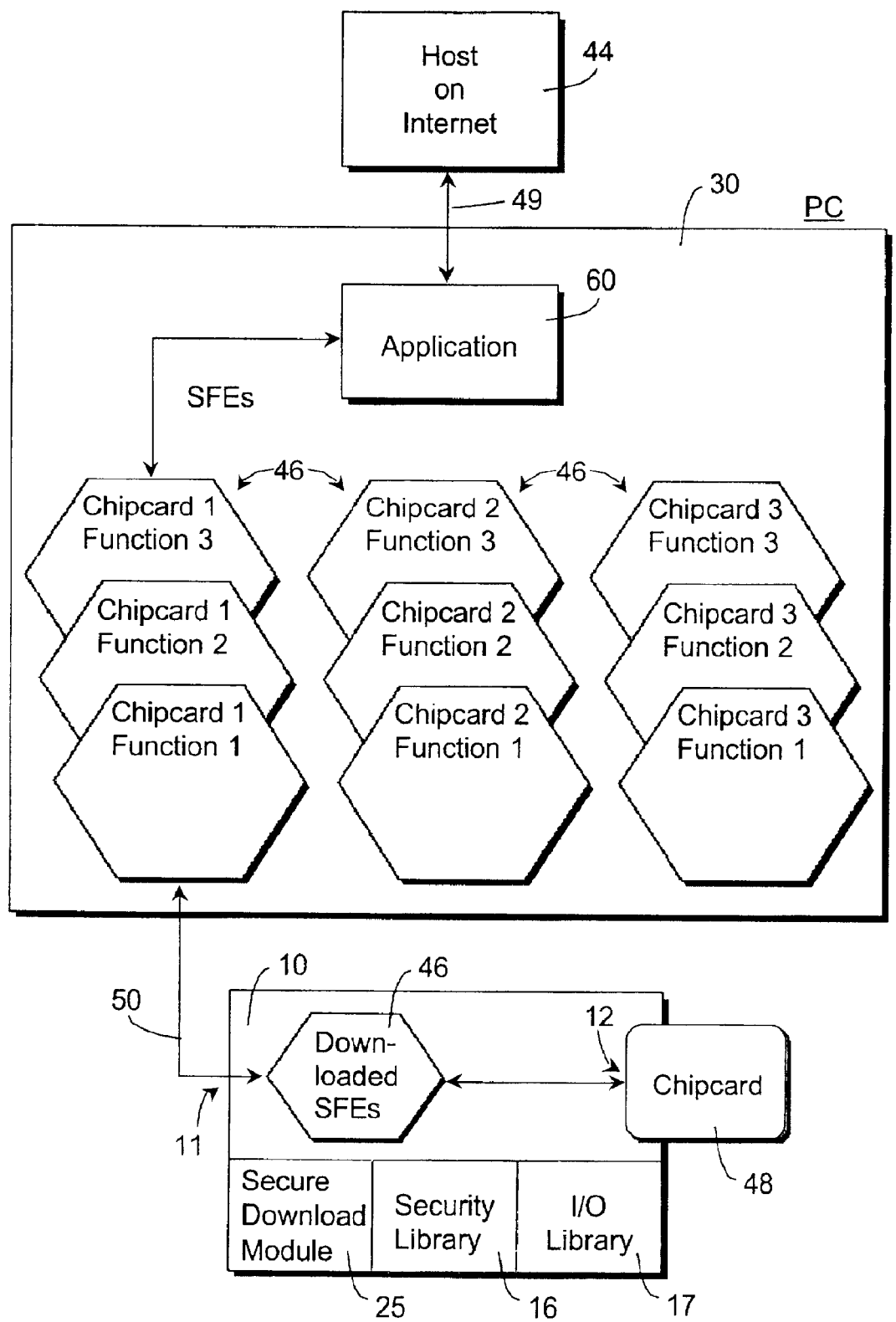
FIG. 3 illustrates in a schematic manner a method of operation in accordance with the present invention.

With reference to FIG. 3, it is now assumed that a user of the PC 30 and the data transfer device 10 intends to purchase merchandise 43 of the shop via its processing device 42.

Generally, once the user of the PC 30 has made his choice as to the merchandise 43 to be purchased, a financial transaction has to be performed using a credit card 48, associated with an account 45 at the bank or authorization entity having the processing device 44.

To this end, the user of the PC 30 contacts the processing device 44 in order to have the financial transaction enabled. As a first input, the user of the PC 30 indicates the type of credit card he intends to use for completing the financial transaction. It will be understood that the type of credit card to be used can be prescribed by the processing device 42 of the shop selling the merchandise 43.

Because of the secure nature of the financial transaction, the processing device 44 of the authorization entity transmits certified SFE program execution data 46 to the transfer device 10 via the Internet 49. Upon receipt of this SFE program execution data 46, the SFE control means 25 check whether this SFE data 46 are certified data, which can be safely loaded into the SFE means 25.

In the affirmative, the control means 20 of the transfer device 10 operate in order to set the transfer device 10 in its secure mode, enabling the keypad means 13, the display means 14 and the card reader means 15, while at the same time the LED 23 is illuminated. The certification or authentication check is provided through the security program library 16 of the data transfer device 10.

If the authentication check fails, due to disapproval of the certificate data or if no certificate data are available at all, the data transfer device is set in its open mode of operation. The control data, i.e. the program execution data received in the data transfer device 10 are deleted if the certificate data are false. In the latter case, no data exchange via the second data interface means 12 of the data transfer device 10 is permitted.

Once in its secure mode, data exchange via the transfer device 10, i.e. its keypad 13, the display means 14 and the card reader means 15 can be regarded as trusted data, such that transactions involving the account 45 at the processing device 44 of the bank or authorization entity can be safely amended. For example, a money transfer from the account 45 of the user to the account of the entity selling the merchandise 43.

The program execution data loaded into the SFE means 25 provide the interaction with and the processing of the data exchange via the card reader means 15. That is, data form the card 48 are processed by the SFE means 25 in accordance with the program execution data loaded through the second data interface means 12 and the control means 20 of the data transfer device 10. In this manner an entity providing a data card can be sure that the card is treated in accordance with pre-defined steps and procedures, approved by this entity.

Once the transaction has been completed, the secure data exchange via the data transfer device 10 can be closed, while the processing device 44 of the authorization entity can inform the processing device 42 of the vendor of the merchandise 43 of the successful completion of the transaction. Accordingly, the merchandise 43 can be delivered with the user.

Dependent on the type of application 60, id. purchasing merchandising, purchasing services, banking or other transactions, different SFE data 46 can be exchanged with the data transfer device 10, providing a flexible as possible transaction system. It is noted that the SFE program execution data 46, also called 'Smartlets' may comprise data for processing the data from the keypad means 13 and/or the card reader means 15 in accordance with a particular data processing function. This data processing function may also be contained in the data on the chip card 48.

In those cases wherein no secure transaction has to be performed, the processing device 44 will transmit UFE program or control data, setting the data transfer device 10 in its open mode. In this mode, the device 10 is configured for exchanging data from the chip card 48 only and in accordance with an open, standard transaction procedure.

Accordingly, with the transaction system of the present invention, multiple data cards or chip cards can be processed in either a secure or an open mode of operation, there by providing a flexible data transfer system.

Further, the transaction system in accordance with the invention is both suitable for use at home and/or in shops or the like, for handling secure and/or open data transactions with a plurality of data storage devices, not limited to chip cards, magnetic strip cards and the like.

In order to enhance the security of the data transaction, after completion thereof the program data 46 or 'Smartlets' can be erased in the data transfer device 10, for example with the withdrawal of the chip card 48. This, in order to avoid that the control data can be extracted from the data transfer device 10. Further, the secure transactions and, of course, also the open transactions, can be performed using any type of encryption of the data exchange between the several processing devices 30, 42 and 44.

Figure 4:
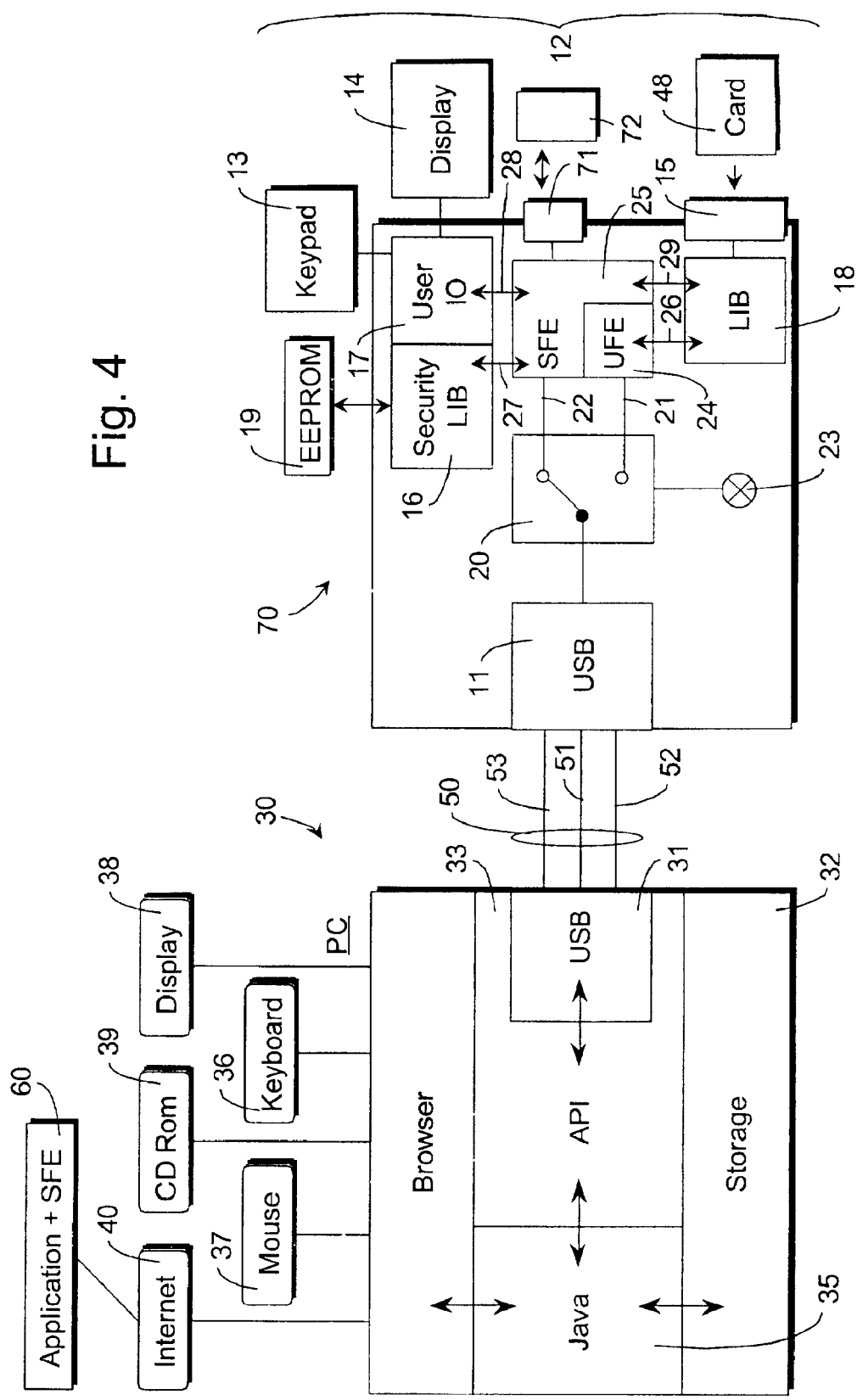
FIG. 4 shows, in a schematic and illustrative manner, a block diagram of a second embodiment of a data transfer device in accordance with the present invention, connected to a processing device, such as a Personal Computer (PC).

FIG. 4 shows a further embodiment of a data transfer device 70 according to the present invention wherein the SFE means 25 are provided with generic Input/Output (I/O) means 71 for the connection of peripheral devices 72, such as, but not limited to telecommunication devices like Voice over IP (VoIP) digital telephones, video and audio processing means, multimedia devices, etc.

The I/O means 71 may comprise one or a plurality of connectors, preferably connectors of a known or standardized type for the connection of a suitable peripheral device.

The data transfer device 70 is arranged such that, only while in its secure mode, data exchange via the I/O means 71 is enabled. Accordingly, in the secure mode of the data transfer device data exchange via the I/O means 71 is provided in a safe and trusted manner.

The data transfer device 70 operates as a miniature Trusted Computer Platform (TCP), for performing trusted data exchange. Because the data transfer device 70 will only execute program data if the device is in its secure mode of operation, an effective virus defense platform is provided, for example.

A typical application example of the data transfer device 70 for enabling telecommunication services, in particular VoIP services, will now be discussed below with reference to FIG. 5.

The data transfer device 70 with its I/O means 71, keypad means 13, display means 14, card reader means 15 and signaling means 23 connects via its first interface means 11 and a data link 50 to a processing device such as a PC 30, to be operated by a user of the telecommunication services.

As illustratively indicated, the PC 30 connects via an interface 40 and a modem or other suitable data link connection device 41 to a data network, such as the Internet 49. Further, a transaction entity operating a processing device 73 connects to the Internet 49, such as a telecommunication service provider or operator providing VoIP services over the Internet 49.

An authorization or authentication entity having a processing device 74, such as a clearing house, likewise connects to the Internet 49. In the example shown, the authorization or authentication entity 74 and the transaction entity 73 may be combined into a single entity providing both functions. However, for clarity purposes, in the remainder it is assumed that both entities are separated.

Figure 5:
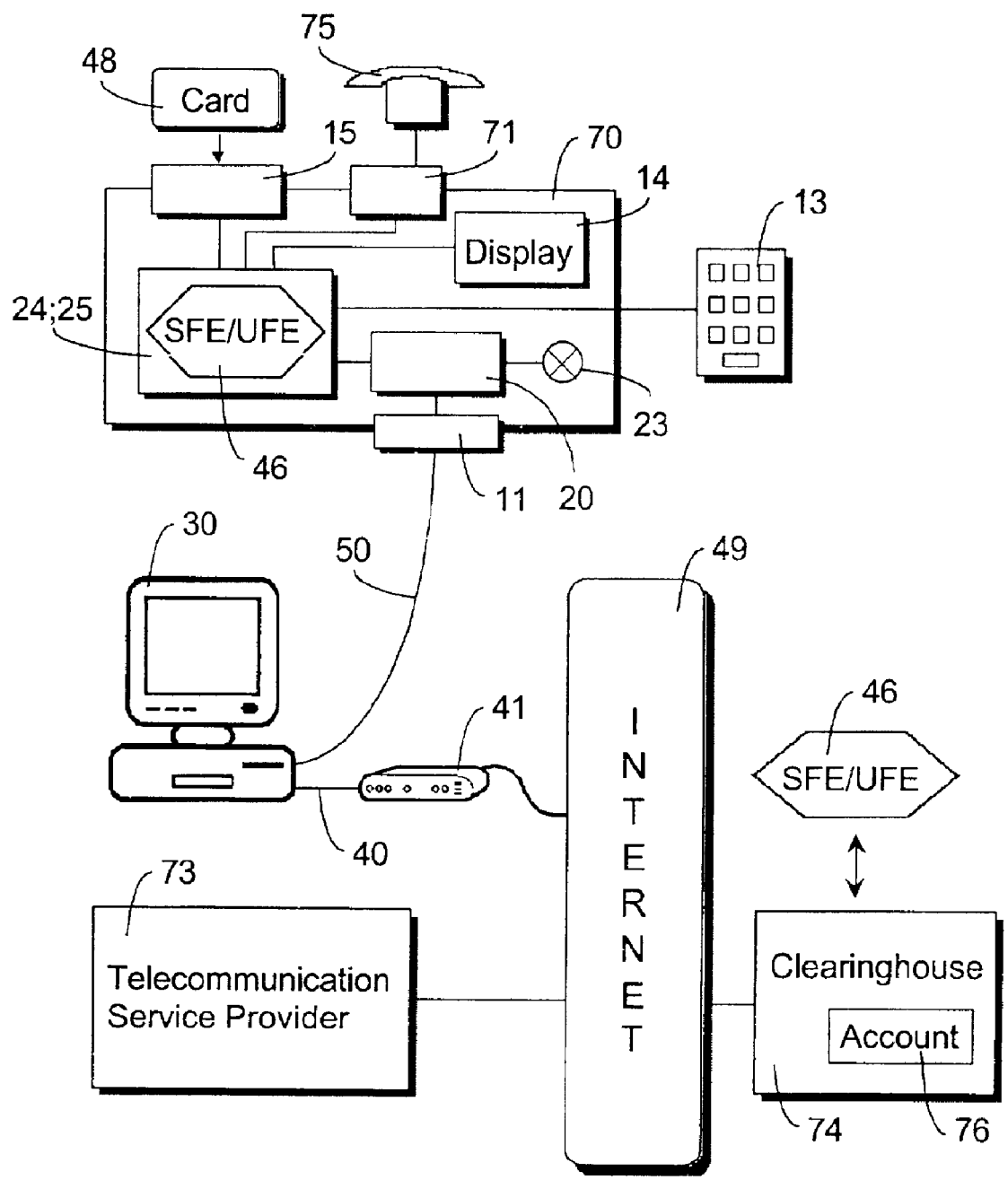
FIG. 5 shows, in a schematic and illustrative manner, another transaction system in accordance with the present invention.

With reference to FIG. 5, it is now assumed that a user of the PC 30 and the data transfer device 70 intends to set up a VoIP telecommunication connection via the I/O means 71 using VoIP telecommunication means 75 connected to the I/O means 71.

Although the example deals with VoIP, it will be appreciated that the telecommunication service provider may provide a plurality of services to a user, which can be displayed at the PC 30. Non-limiting examples of such services are VoIP, facsimile, voice response control, remote calling in, personal address book, etc.

Generally, once the user of the PC 30 has made his choice as to the services to be retrieved, an identification transaction has to be performed using a chip card 48, for example, associated with an identification account 76 at the authorization entity having the processing device 74.

To this end, the user of the PC 30 contacts the processing device 74 in order to have the identification transaction enabled. As a first input, the user of the PC 30 indicates the type of chip card 48 he intends to use for completing the identification transaction. It will be understood that the type of chip card 48 to be used can be prescribed by the processing device 42 of the telecommunication service provider.

Because of the secure nature of the identification transaction, the processing device 74 of the authorization entity transmits certified SFE program execution data 46 to the data transfer device 70 via the Internet 49. Upon receipt of this SFE program execution data 46, the SFE control means 25 check whether this SFE data 46 are certified data, which can be safely loaded into the SFE means 25.

In the affirmative, the control means 20 of the data transfer device 70 operate in order to set the data transfer device 70 in its secure mode, enabling the keypad means 13, the display means 14, the card reader means 15 and the I/O means 71, while at the same time the LED 23 is illuminated. The identification or authentication check is provided through the security program library 16 of the data transfer device 70. If the authentication check fails, due to disapproval of the certificate data or if no certificate data are available at all, the data transfer device 70 is set in its open mode of operation. The control data, i.e. the program execution data received in the data transfer device 70 are deleted if these certificate data are false. In the latter case, no data exchange via the second data interface means 12 of the data transfer device 10 is permitted.

Once in its secure mode, data exchange via the transfer device 70, i.e. its keypad 13, the display means 14, the card reader means 15 and the I/O means 71 can be regarded as trusted data, such that transactions involving the identified user 30 can be safely provided.

Once the identification transaction has been completed, the secure data exchange via the I/O means 71 of the data transfer device 70 can be enabled, in that the processing device 74 of the authorization entity can inform the processing device 73 of the telecommunication provider of the successful completion of the identification transaction. Accordingly, the services can be provided. That is, the telecommunication service provider may provide the requested service(s) to the user 30, such as VoIP.

The I/O means 71 are enabled if the SFE program execution data 46 are put into action, that is executed. The executable part of the SFE data 46 controls the I/O means 71. After having successfully performed the security step, the I/O means 71 can be enabled and/or disabled by the SFE software. In the case of SFE program data relating to VoIP, the peripheral devices, such as a microphone and loudspeaker connected to the I/O means 71 will be put into operation once the VoIP link has been established. Likewise, the I/O means will be disabled by the SFE VoIP program data once the VoIP link has been terminated.

Further, the SFE program execution data can be arranged such that, while the chip card 48 is inserted or connected to the chip card reader means 15 of the data transfer device 70, the SFE program execution data will be available and/or active in the data transfer device 70. Removing the chip card 48, for example at the completion of the service provision, i.e. if the user 30 terminates a VoIP call, the I/O means 71 will be disabled by the disabling of the respective SFE program data. It has to be understood that the I/O means 71 of the data transfer device 70 are solely controlled under the responsibility of the respective SFE program execution data loaded into the data transfer device 70.

It will be appreciated that the identification procedure disclosed above in connection with the retrieval of telecommunication services, for example, may also involve debiting of a bank account or other money relating account for payment of the services provided, for example. Such as disclosed above in connection with the purchase of goods.

That is, together with or in a similar operation as the above disclosed identification transaction, a financial transaction involving a financial account 45 (e.g. a payment transaction) with a bank 44 or a clearing house 74 may be initiated for enabling the I/O means 71.

It will be appreciated that, instead of telecommunication services, other services may be provided to a user via the I/O means 71, among others multi media type services.

Although the transaction system and method according to the invention have been disclosed by reference to its use via the Internet 49, those skilled in the art will appreciate that any other data network for the transfer of data can be used, such as the Public Switched Telephone Network (PSTN), the Integrated Services Digital Network (ISDN), a Cable Tele-Vison (CaTV) network and the like, or even a direct link with the processing devices 42 and/or 44.

The invention further relates to an Application Specific Integrated Circuit (ASIC) device comprising any or a selection of the control means 20, the SFE and UFE means 24, 25, the storage means 16, 17, 18 and the data interface means 11. Such an ASIC provides enhanced security to the data transfer device 10 as a whole.

Various modifications in the design and implementation of the various components and method steps discussed above may be made without departing from the spirit and scope of the invention, as set forth in the appended claims.

What is claimed is:

1. A data transfer device, having a first data interface for exchanging data with a data processing system, a second data interface for exchanging data with a user device, and a control unit for selectively enabling data transfer between said first and second data interfaces in one of an open mode and a secure mode of operation, wherein said control unit is configured for receiving control data associated with an application to be processed by said data processing system and for providing an authentication check on said control data for setting said data transfer device in either one of the open and the secure modes of operation.

2. A data transfer device according to claim 1 wherein said control unit is configured for processing data provided by said first and second data interfaces in accordance with said control data.

3. A data transfer device according to claim 1 wherein said control unit is configured for processing data provided by said first and second data interfaces in accordance with program execution data to be executed by said data processing system, wherein said program execution data is comprised by said control data.

4. A data transfer device according to claim 1 wherein said control unit is configured for enabling part of said first and second data interfaces for operation in the open mode.

5. A data transfer device according to claim 1 wherein said control unit is configured for enabling said second data interface for operation in the secure mode and for executing program execution data if said data transfer device is set in the secure mode of operation.

6. A data transfer device according to claim 1, further comprising data storage means for storing certificate data, wherein said control data comprise certificate data, and said control unit is configured for checking said certificate data of said control data with respect to certificate data stored in said data storage means, for setting said data transfer device in the secure mode of operation if said certificate data of said control data are approved and for setting said data transfer device in the open mode of operation for either one of disapproval of said certificate data and non-availability of certificate data of said control data, and for deleting said control data if said certificate data thereof are false.

7. A data transfer device according to claim 1 wherein said control unit is configured for enabling part of said first and second data interfaces for operation in an open mode, and wherein said control unit is configured for enabling said second data interface for operation in the secure mode, said second data interface comprises keypad means, data card reader means and display means, said control unit in said open mode is configured for enabling access to said data card reader means, and said control unit in said secure mode is configured for enabling access to said keypad means, data card reader means and display means.

8. A data transfer device according to claim 7 wherein said control unit is configured for processing data provided by said card reader means in accordance with said control data received.

9. A data transfer device according to claim 1 wherein said control unit is configured for enabling part of said first and second data interfaces for operation in the open mode, and wherein said control unit is configured for enabling said second data interface for operation in the secure mode, wherein said second data interface comprises Input/Output (I/O) means for data exchange with at least one peripheral device to be connected to said I/O means, and wherein said control unit in said secure mode is configured for enabling access to said I/O means by said at least one peripheral device.

10. A data transfer device according to claim 9 wherein said I/O means are configured for connecting at least one data communication device.

11. A data transfer device according to claim 9 wherein said I/O means are configured for connecting at least one Voice over IP (VoIP) digital telephone device.

12. A data transfer device according to claim 1 wherein said control unit is configured for enabling part of said first and second data interfaces for operation in an open mode, and wherein said control unit is configured for enabling said second data interface for operation in the secure mode, further comprising signaling means for signaling said mode of operation of said data transfer device.

13. A data transfer device according to claim 12 wherein said signaling means comprise a Light Emitting Diode (LED), and said control unit is arranged for illuminating said LED if said data transfer device is in its secure mode of operation.

14. A data transfer device according to claim 1, further comprising means for supporting encrypted data transfer via said first interface.

15. A data transfer device according to claim 1 wherein said first data interface comprises a standardized computer data interface, such as USB (Universal Serial Bus) interface.

16. An Application Specific Integrated Circuit (ASIC) device comprising data exchange means and control means for selectively enabling data exchange between first and second data interfaces based on control data in accordance with claim 1.

17. An ASIC device according to claim 16, further comprising at leas one of said first and second data interfaces.

18. An ASIC device according to claim 16, further comprising a data processing unit to process data provided by said first and second data interfaces in accordance with program execution data provided by said control data.

19. An ASIC device according to claim 16, further comprising a data storage unit, among others to store said control data, said program execution data and authentication data.

20. A transaction system, comprising a first processing device such as to be operated by an authorization entity, a second processing device such as to be operated by a user, and a data transfer device having a first data interface to exchange data with a data processing system, a second data interface to exchange data with a user device, and a control unit to control data transfer between said first and second data interfaces in one of an open mode and a secure mode of operation, wherein said first and second processing devices connect to a data network, said data transfer device with its first interface connects to said second processing device, and said first and second processing devices being configured to exchange control data, associated with an application to be processed by said data processing system, from said first processing device to said data transfer device, wherein said first processing device is configured to provide the control data to set said data transfer device in the secure mode or the open mode based on an authentication check performed on the control data by the control unit.

21. A transaction system, according to claim 20, further comprising a third processing device such as to be operated by a transaction entity, wherein said third processing device connects to said data network, and said first processing device being configured to enable a transaction between said second and third processing devices dependent on enabling of said second data interface of said data transfer device.

22. A transaction system according to claim 21 wherein said transaction between said second and third processing devices involves exchange of trusted data between said first and second processing devices, wherein said first processing device is configured to provide control data to set said data transfer device in the secure mode of operation and wherein said third processing device is configured to enable said transaction between said second and third processing devices after said trusted data have been successfully exchanged.

23. A transaction system according to claim 21 wherein said second data interface comprises Input/Output (I/O) means for data exchange with at least one peripheral device to be connected to said I/O means, said transaction between said second and third processing devices involves exchange of trusted data between said first and second processing devices, said first processing device being configured to provide control data to set said data transfer device in the secure mode of operation and said third processing device is configured to enable a transaction between said I/O means and said third processing device after said trusted data have been successfully exchanged.

24. A transaction system according to claim 21 wherein said transaction entity is a telecommunication service provider.

25. A transaction system according to claim 21, comprising a plurality of first, second and third processing devices wherein said data network is a public data network, such as the Internet.

26. A third processing device configured for operating in accordance with claim 21.

27. A first processing device configured for operating in accordance with claim 20.

28. A second processing device configured for operating in accordance with claim 20.

29. A method of exchanging data with a data processing system using a data transfer device having a first data interface for exchanging data with said data processing system, a second data interface for exchanging data with a user device, and a control unit for controlling data transfer between said first and second data interfaces in one of an open mode and a secure mode of operation, said method comprising:

transferring control data from said data processing system to said data transfer device, the control data being associated with an application to be processed by the data processing system; and performing an authentication check on the control data to set the data transfer device in either one of the open and the secure modes of operation.

30. A method according to claim 29 wherein said control data comprise certificate data, wherein said control data being checked by said control unit with respect to said certificate data, and wherein said data transfer device is set in its secure mode of operation if said certificate data of said control data are approved and said data transfer device is set in its open mode of operation for either one of disapproval of said certificate data and non-availability of certificate data of said control data, said control data being deleted if said certificate data thereof are false.

31. A method according to claim 30 wherein said data transfer device in its open mode of operation exchanges data with said second data interface through a limited number of data input means thereof, including a data card reader, whereas the data transfer device in its secure mode of operation exchanges data with said second data interface through a plurality of data input and output devices thereof, including keypad unit, display unit, card reader unit, and Input/Output (I/O) unit for data exchange with at least one peripheral device to be connected to said I/O unit.

32. A method according to claim 31 wherein said I/O unit is enabled and disabled under control of program execution data of a program executed by said data processing system, said program execution data being comprised by said control data.

33. A method according to claim 32 wherein said program execution data are operative in said data transfer device while a data card operatively connects to said card reader unit.

34. A method according to claim 29 wherein data provided by said first and second data interfaces are processed in accordance with program execution data of a program executed by said data processing system, said program execution data being comprised by said control data.

35. A method according to claim 29 wherein data between said data processing system and said data transfer device are exchanged in an encrypted form.

36. A method according to claim 29 wherein control data in said data transfer device are erased after the completion of a data exchange.

* * * * *